United States Patent [19]

Kronseder et al.

[11] Patent Number: 4,496,040
[45] Date of Patent: Jan. 29, 1985

[54] APPARATUS FOR WIDENING AND SLOWING DOWN A STREAM OF UPRIGHT BOTTLES

[75] Inventors: Hermann Kronseder, Worth; Egon Schneider, Neutraubling, both of Fed. Rep. of Germany

[73] Assignee: Krones AG Hermann Kronseder Maschinenfabrik, Neutraubling, Fed. Rep. of Germany

[21] Appl. No.: 514,554

[22] Filed: Jul. 18, 1983

[30] Foreign Application Priority Data

Jul. 30, 1983 [DE] Fed. Rep. of Germany ....... 3228453

[51] Int. Cl.³ .............................................. B65G 47/26
[52] U.S. Cl. ..................................... 198/434; 198/436
[58] Field of Search ............... 198/434, 436, 442, 443, 198/445

[56]  References Cited

U.S. PATENT DOCUMENTS 3,279,579 10/1966 Englander et al. ................. 198/442
3,552,537 1/1971 Vamvakas ........................... 198/442
4,308,944 1/1982 Probst ................................. 198/442

FOREIGN PATENT DOCUMENTS 2627277 12/1977 Fed. Rep. of Germany ...... 198/442
3004259 8/1981 Fed. Rep. of Germany .
1321689 6/1973 United Kingdom .

Primary Examiner—Joseph E. Valenza
Assistant Examiner—Jonathan D. Holmes
Attorney, Agent, or Firm—Fuller, House & Hohenfeldt

[57] ABSTRACT

A container rearranging station wherein bottles or other containers enter in single file and are discharged with several of them abreast of each other. The station is comprised of three parallel running conveyor sections. All the sections are tilted at the same angle so as to provide a smooth inclined plane. A supply conveyor on which the bottles arrive in single file is the highest of those on the inclined plane and runs at the highest speed of any of them. The adjacent intermediate conveyor runs at a slightly slower speed and the adjacent lower most discharge conveyors run at a uniform but still slower speed. Inclination angles of the conveyors between the input region of the station and the output region where the containers are abreast are preferably adjustable between 8° and 11° so that the containers drift from the supply conveyor through the intermediate conveyor to the discharge conveyor. On the highest supply conveyor side there is a guide surface or deflector which is operative to deflect the containers off of the supply conveyor if they do not drift off early enough. Only bottles with exceptionally rough bottoms generally reach the deflector. Most of the containers slide off of the supply conveyor randomly before they reach the deflector. Thus, container collisions and noise are substantially reduced.

6 Claims, 2 Drawing Figures

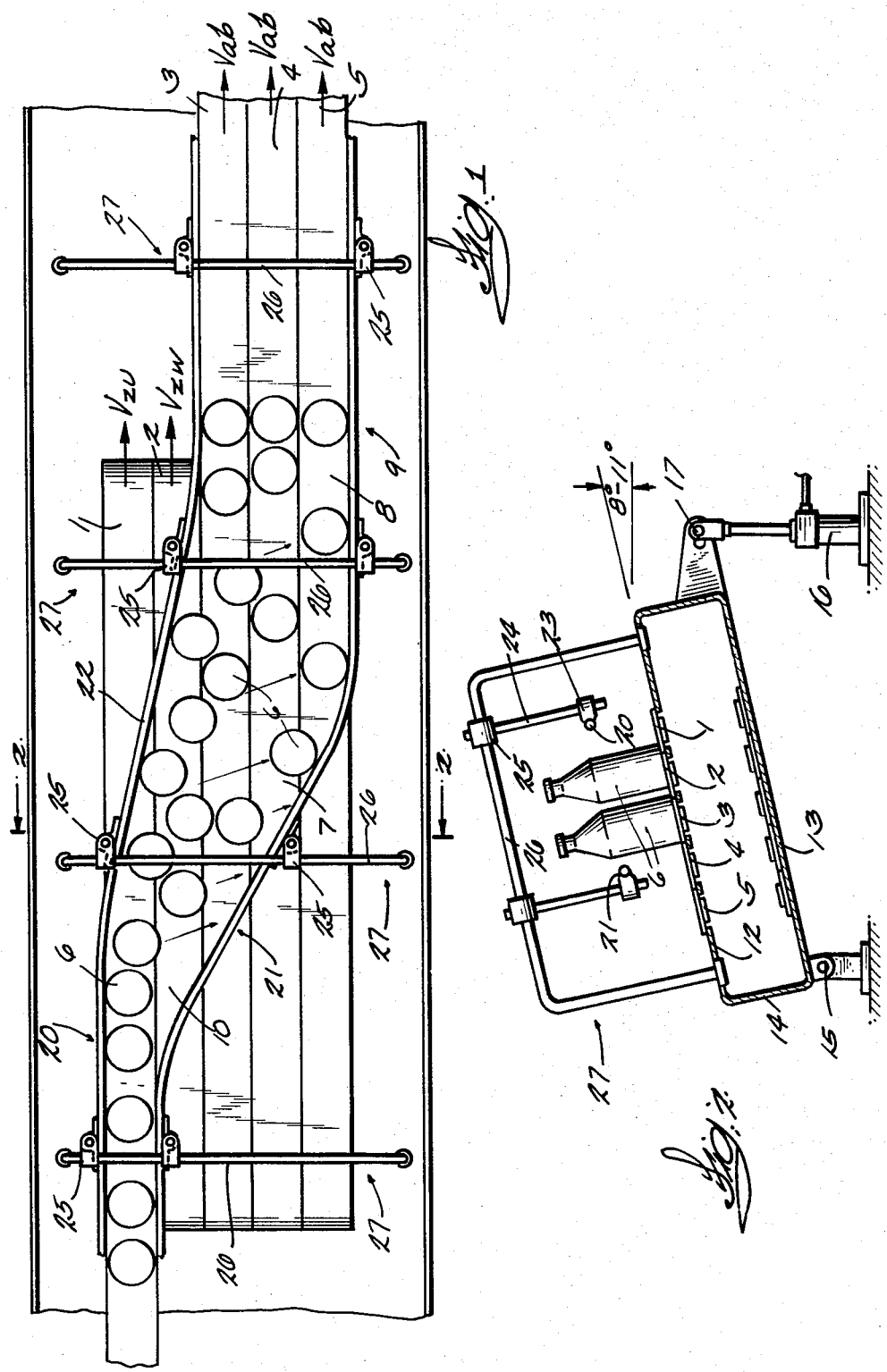

APPARATUS FOR WIDENING AND SLOWING DOWN A STREAM OF UPRIGHT BOTTLES

BACKGROUND OF THE INVENTION

The invention relates to a conveyer wherein bottles or other containers moving in a single row are rearranged to continue movement in several rows at reduced velocity. Conversely, the apparatus is adapted to rearrange containers that are moving abreast of each other in multiple rows so that they converge into a single row at increased velocity.

There is prior art apparatus for accomplishing the functions set forth in the preceding paragraph. In one type of apparatus wherein containers such as bottles are rearranged from single rows to multiple rows, the containers move on several parallel conveyer belts, some of which move at different linear velocity than others. For instance, the containers that are coming into the rearrangement area in a single row are buried on the conveyor belt that has the highest speed. A deflector or guide rail is situated above this conveyor and is properly angulated for deflecting incoming containers laterally or crosswise onto one or more adjacent slower moving conveyer belts and then onto a group of belts that are running at the same linear velocity and upon which the containers continue abreast of each other. Although deflection by the guide rails from the first conveyer to the next is in a rather predictable course, later the movements of the containers are rather random and they are spread across the final uniform speed conveyors largely by colliding and pushing each other. These random movements and repetitive collisions cause generation of undesirable noise. In addition, if the containers have labels they are sometimes damaged by the collisions which is obviously undesirable.

In another type of prior art of apparatus for rearranging containers from several rows into a single row, there is a slowly traveling supply conveyor, and intermediate conveyor rotating with gradually higher speed and a rapidly traveling discharge conveyor. These conveyors are inclined slightly transversely to their direction of travel. The transfer of containers from the supply to the discharge conveyor takes place by means of an incline conveyor against which all bottles come up. Inclination of the conveyor is solely for eliminating tipped-over bottles by letting them role off. This prior art apparatus is shown in German Laid Open Specification No. 30 04 259.

SUMMARY OF THE INVENTION

An object of the new single-two-multiple row and multiple row-two-single row container rearranging apparatus is to accomplish rearranging with a simple and space saving structure and, above all, with a reduction of collision forces and, hence, a marked noise reduction.

In the combining and separating apparatus described herein there is a supply conveyor, one or more intermediate conveyors and several discharge conveyors all arranged in parallelism with each other and moving in the same direction. Containers (hereafter called bottles) come into the rearranging station on the fastest moving conveyor and they strike a deflector which initiates their shift to the adjacent slower moving and parallel conveyors. All of the conveyors form a uniformly flat surface but this surface, in accordance with the invention, is inclined so that the bottles are not only deflected initially somewhat transversely to the line of action of the conveyors but they are also caused to slip or drift under the influence of a gravitational component along the declining conveyor surfaces whereupon they tend to distribute in a plurality of rows by the time they cross over onto the most slowly moving and lower most conveyors. Because the bottles slide transversely other conveyors at the same time as they are moving longitudinally they tend to remain close to each other without developing significant gaps between them. This is advantageous in that if blockage of the multiple rows in the discharge region of the rearranging station occurs, moving bottles will not be transported over a gap whereupon they may strike standing bottles with significant force and thereby cause possible breakage, defamation of labels if any are on the bottles, and noise.

The conveyors are composed of flat steel plates that are pivotally connected to powered-driven translating conveyor chains. The plates all lie in the same plane and present no ridges which could tips the bottles as they are sliding from conveyor-to-conveyor. A further feature is that the angle of inclination of the conveyors is about 8° to 11°. The angle is adjustable. The rougher the bottom of the bottles or other containers is, the greater should be the angle of inclination of conveyors in order to promote lateral slipping or drifting of the bottles across the conveyors. Generally speaking, the angle of inclination is selected such that it lies at that limit at which bottles with a relatively smooth bottom drift off immediately, while bottles with a relatively rough bottom take a longer interval for the transition to the discharge conveyor. Use of the apparatus has demonstrated that during drifting off of the bottles from the supply conveyor to the intermediate and discharge conveyors, the bottles disburse in such a manner as to initiate formation of several rows substantially before reching the discharge region of the rearranging station. The deflector is so configured and arranged that any bottles with bottoms having a high coefficient of friction such as do not drift off of the supply conveyor, will be positively deflected from the supply conveyor to the intermediate and discharg conveyors. Only those bottles with a high coefficient of friction will be delayed in drifting off of the supply conveyor long enough to reach the deflector whereupon it is a statistical certainty that all of the bottles will not leave the supply conveyor at or near the same point.

In same cases, the angle of the inclination of the conveyors can be set steeper so that normally the bottles will slide off of the supply conveyor randomly without reaching the deflector rail.

In all cases, the bottles are transferred entirely or partially by downward drift to different pass of movement from the rapidly traveling supply conveyor through the slower, intermediate conveyor or conveyors and, finally to the slowest traveling multiple discharge conveyors where they form the nicely arranged multiple rows.

An illustrative embodiment of the invention will now be described in greater detail in reference to drawings.

DESCRIPTION OF THE DRAWINGS

FIG. 1 is a diagrammatic plan view of the bottle rearranging station of a conveyor system wherein a single row of bottles is converted to multiple rows; and FIG. 2 is a vertical section taken on a line corresponding to 2—2 in FIG. 1.

DESCRIPTION OF A PREFERRED EMBODIMENT

A bottle rearranging station, in accordance with the convention, is depicted in FIG. 1. It comprises five conveyors that are translating in parallel, 1, 2, 3, 4 and 5. Conveyor 1 is a supply conveyor on which a single row of bottles 6 is being conveyed from left to right in FIG. 1. The bottles are disbursed laterally in a zone 7 and are recombined in a discharge region 8, the form of individual rows in which the bottle are abreast of each other as in the row marked 9. Of course, there are many such rows formed abutting each other through the right of row 9 if the conveyor system is fully loaded. Sometimes, down the line from discharge region 8 and row 9 something occurs such as a stoppage at a case filling machine, not shown, where the bottles in the discharge region and beyond it come to a stop while at the same time, bottles continue to be fed in the infeed region 10 and the conveyors 1–5 continue to move.

The individual conveyors 1–5 are typically comprised of a series of plates which are hingedly connected to each other so they can go around sprockets and form closed loops. One may see in FIG. 2 that the plates glide on a slotted support 12 as the conveyors progress in one direction and they are supported on a planar surface 13 for making their return run.

The conveyor support is mounted for pivoting about axes 15. The support may be adjusted to any angularity with respect to horizontal by means of any suitable jack device such as hydraulic cylinder 16 whose piston rod connects pivotally at 17 to the conveyor support. The angle of inclination of the conveyor is generally about 10° but allowance should be made for adjusting the conveyors to an inclination angle at least in the range of 8° to 11°. If desired, the conveyors 3–5 may be allowed to return to perfect horizontal position since it is only in the bottle rearranging station that a uniform inclination of the adjacent conveyors 1–5 is necessary in accordance with the invention. The supply conveyor 1 is driven at a linear velocity designated $V_{zu}$ for transporting bottles 6 with a certain mutual spacing. The velocity of intermediate conveyor 2 is designated as $V_{zw}$ and the velocity of conveyor is 2 is less than that of conveyor 1. In this example, there is only one intermediate conveyors 2, but it will be understood that where a greater number of bottles are to be arranged abreast of each other as in row 9, more than one intermediate conveyor 2 may be used to provide a more gradual change in linear velocity between adjacent feed and intermediate conveyors before the bottles slide down the incline through the discharge conveyors 3–5 which all translate at the same velocity which is more than the velocity of the intermediate conveyor or conveyors 2 and a supply conveyor 1.

Because all of the conveyors are inclined similarly, the bottle 6 begin to slide off of supply conveyor 1 in the infeed region 10 and move transversely of conveyor movement to the intermediate conveyor 2 and finally to the discharge conveyors 3–5. Because the bottles move off of the supplier conveyor randomly, some will get onto the discharge conveyors sooner than others which is desirable because it prevents bunching up of the bottles on the high side of the conveyors in the discharge region and, moreover, it prevents big gaps from forming between consecutive bottles. This is important because if there are gaps and bottles in the discharge region are either bunched up or come to a stop a moving bottle at the trailing end of the gap would continue to be propelled or conveyed forward until it collided sharply with another bottle. The accelerated, lateral spreading of the bottles resulting from the simple but clever idea of having the conveyors decline from the high velocity conveyor to the lowest velocity conveyors greatly minimizes gaps compared to non-decline conveyors of the prior art and, hence, noise is greatly reduced in the rearranging station described herein.

It will be noted that on account of the lateral or downward drift or sliding of the bottles due to the slope of the conveyors and the linear component of the conveyors, the bottles execute a curved-shape path over the intermediate speed conveyor 2. This path of movement of the bottles varies somewhat depending on the friction between the bottle bottoms and the conveyors. Rails 20 and 21 are provided to guide and deflect the bottles as required. These guide rails are preferably made of a plastic or nonmetallic material. Note that rail 20 is angulated so it extends over supply conveyor 1 and intermediate conveyor 2. if more intermediate conveyors were present, this angulated portion of the rail would desirably extend over all of them. The angulated portion of rail 20 will deflect any bottles 6 that do not slide off of supply conveyor 1 by themselves and onto intermediate conveyor 2. Any bottles that are deflected off of supply conveyor 1 by rail 20 will, of course, continue their lateral or actually curved drift, so as to spread out across the discharge conveyors 3–5 under the influence of the slope of the conveyor surfaces. The angulated deflector portion 22 of the highest rail 20 among other things, assures that any bottle 6 that do not slide off of supply conveyor 1 and intermediate conveyor 2 under the influence of the slope will be diverted at least far enough to bring them onto the fist conveyor 3 of the 3–5 discharge conveyor group. If the angle of inclination of the conveyors is less than it should be, it may occur that deflector rail portion 22 is contacted with some of the bottles, thereby start their downward drift. However, as indicated earlier, if the bottles have such high friction as to cause this to occur, the slope can be adjusted with actuator 16, that is, increased so that the bottle slide off of the supply and intermediate conveyors 1 and 2 earlier.

The conveyor rails 22 are mounted for being adjusted laterally and vertically. Typical upper rail 20 is carried on clamping members 23 which are adjustable vertically on rods 24. These rods, in turn, are carried by clamping members 25 which can be slid and clamped anywhere along laterally extending sections 26 of inverted U-shaped support members 27.

The guide rail 21 on the low side of the paralleled and inclined conveyors does not ordinarily contacted by the stream of bottles. Rail 21 is primarily for preventing bottles from being forced off of the conveyors in the case where flow of bottles out of the discharge region is prevented due to some blockage down the line. The lower deflector 21 is also arranged for guiding those bottles that drift down rapidly into the desired path of movement. It will be understood that the bottle rearranging station depicted in FIG. 1 is only a part of a conveyor system in a bottling plant, for example. Thus, such equipment as bottle filling and capping machines, labeling machines and bottle packers may be arranged about the conveyor. By way of example, the bottles 6 in the input region 10 of the rearranger may be coming in on supply conveyor 1 from a labeling machine, not shown, and the bottles are typically uniformly spaced from each other. The bottles are usually supplied from a conveyor that is horizontal and supports the bottles in a perfectly vertical orientation. The supply conveyor encounters a twist in its support as the rearranging station is approached. Thus, when the bottles pass onto the section of supply container 1 shown in FIG. 1 they become tilted slightly. Then they start to drift, generally laterally of their path of movement and at least some of them, rather quickly, slip onto the intermediate conveyor or conveyors 2 in which case if there are two or more intermediate conveyors they may run at successively lower speeds below that of supply conveyor 1. The incoming bottles that do not slip off of supply conveyor 1 shortly after entering the rearranging station, will be positively deflected off of the supply conveyor by the deflector rail 22. There is another decrease in the longitudinal speed of the bottles when they get onto the plurality of discharge conveyors 3–5. There is a lateral displacement of the bottles as they transfer to the higher to the lower speed conveyors on account of the different frictional conditions that exists between individual bottles and conveyors. Further lateral displacement occurs during the transfer from the intermediate speed to the lower speed discharge conveyors and there is even further lateral displacement after the bottles get onto the discharge conveyors due to the uniform slope of the parallel conveyors. Thus, the bottles are displaced on the discharge conveyor or conveyors so that they fill up their entire width. The intermediate conveyor need not be constructed as a separate unit. It may also be formed as part of the discharge conveyor and driven at a corresponding speed.

We claim:

1. Apparatus having an input region for containers being transported longitudinally in single file and an output region for the containers after they have been rearranged in rows containing a plurality of containers substantially abreast of each other, comprising a longitudinally moving supply conveyor for feeding said containers into the input region, a longitudinally moving intermediate conveyor disposed adjacent and in parallelism with the supply conveyor and moving at a lower speed than the supply conveyor, and a longitudinally movable discharge conveyor disposed adjacent the intermediate conveyor and in parallelism therewith and moving at a lower speed than the intermediate conveyor, and the improvement wherein the container supporting surfaces of said supply conveyor, at least in said input region, and said intermediate conveyor, and said discharge conveyor, at least up to the discharge region are all inclined to form a continual transversely inclined surface such that said containers will slide down the inclined surface from the supply conveyor to the discharge conveyor as they progress toward said output region.

2. The apparatus according to claim 1 including means for supporting the conveyors jointly, and adjusting means operative to selectively raise or lower one side of the supporting means to thereby determine the inclination angle of the continual inclined surface.

3. The apparatus according to any of claims 1 or 2 wherein said continual inclined surface has an inclination angle relative to horizontal in the range of about 8 to 11 degrees.

4. The apparatus according to claim 1 including guide rail means extending along at least a part of said supply conveyor in said input region and having a section crossing over said supply conveyor and intermediate conveyor at an acute angle relative to the longitudinal direction to thereby reach and extend along said discharge conveyor, said seciton, when encountered by any containers that have not yet slid off the supply conveyor, deflecting said containers onto said intermediate conveyor.

5. Apparatus according to claim 1 including guide rail means arranged for crossing over said supply conveyor and said intermediate conveyor at an acute angle relative to the longitudinal direction, said rail means beginning its crossover on the high side of the inclined surface at a distance downstream of the said input region and ending substantially at said discharge conveyor, said rail means thereby being effective to deflect any containers that have not slid off of the supply conveyor within said distance from said supply conveyor on to at least said intermediate conveyor.

6. Apparatus according to any of claims 1, 2, 4, or 5 including rail means extending across said intermediate conveyor and said discharge conveyor at an acute angle relative to the longitudinal direction, said rail means beginning upstream at approximately the entrance to said input region and on the lower side of the inclined intermediate conveyor and extending downstream to said output region on the lower side of said discharge conveyor, the location of said rail means being such that most of the containers will be advanced longitudinally sufficiently while sliding on said intermediate and discharge conveyors to not strike said rail and only those containers which slide transversely earliest from said supply conveyor will be deflected by said rail means and thereby be directed longitudinally.

* * * * *

UNITED STATES PATENT AND TRADEMARK OFFICE
CERTIFICATE OF CORRECTION

PATENT NO. : 4,496,040
DATED : January 29, 1985
INVENTOR(S) : Hermann Kronseder and Egon Schneider It is certified that error appears in the above-identified patent and that said Letters Patent are hereby corrected as shown below:

On the title page:
The "July 30, 1983" Foreign Application Priority Data

Item /30/ should read -- July 30, 1982 --.

Signed and Sealed this

Seventeenth Day of June 1986

[SEAL]

Attest:

DONALD J. QUIGG

Attesting Officer

Commissioner of Patents and Trademarks